(No Model.) 2 Sheets—Sheet 1.
A. J. JOHNSON.
HARVESTER ATTACHMENT.
No. 541,093. Patented June 18, 1895.
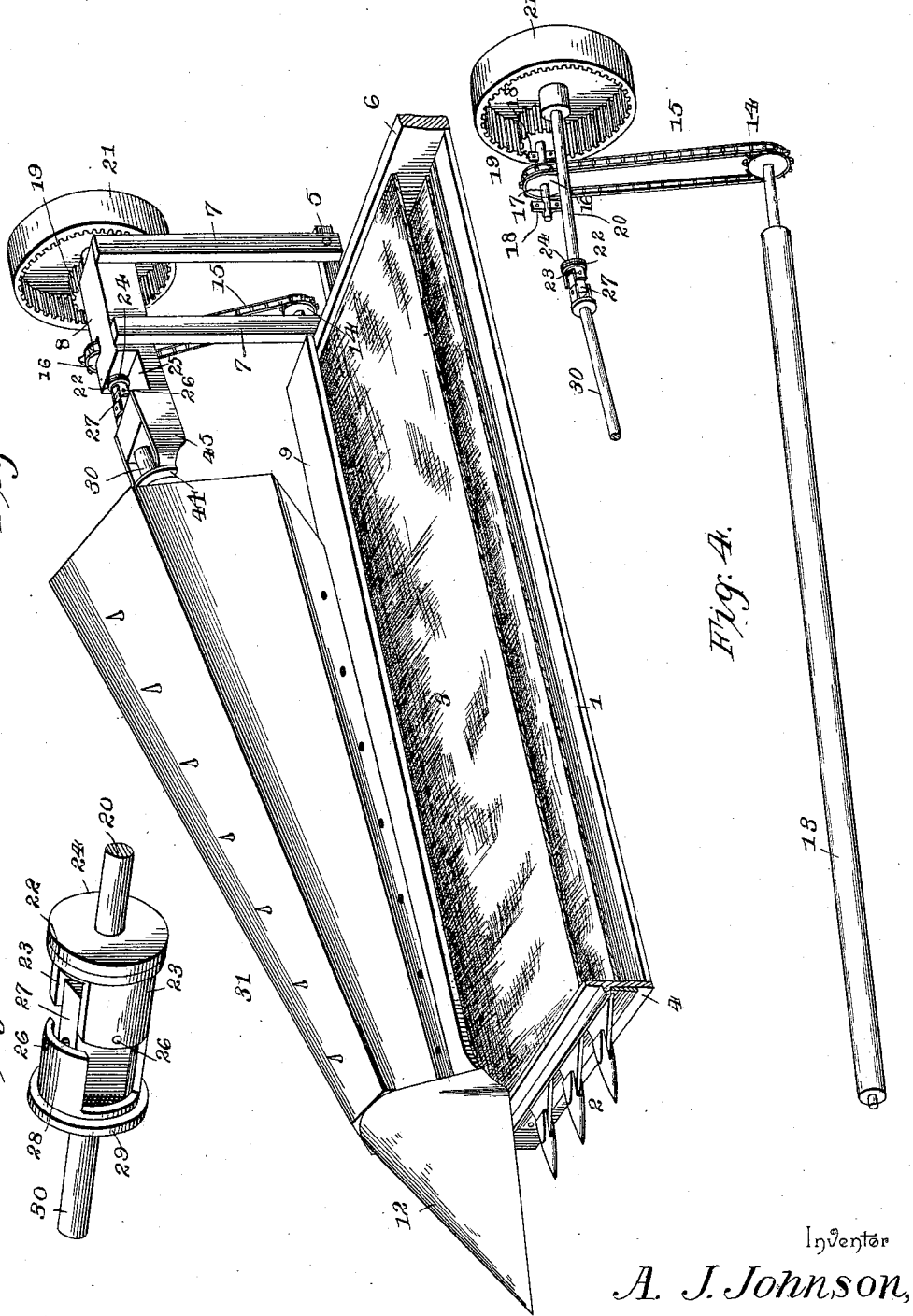
Witnesses
Chas A. Ford.
J. B. Owens.
Inventor
A. J. Johnson,
By his Attorneys.
C. A. Snow & Co.
THE NORRIS PETERS CO., PHOTO-LITHO., WASHINGTON, D. C.

(No Model.) 2 Sheets—Sheet 2.
A. J. JOHNSON.
HARVESTER ATTACHMENT.
No. 541,093. Patented June 18, 1895.
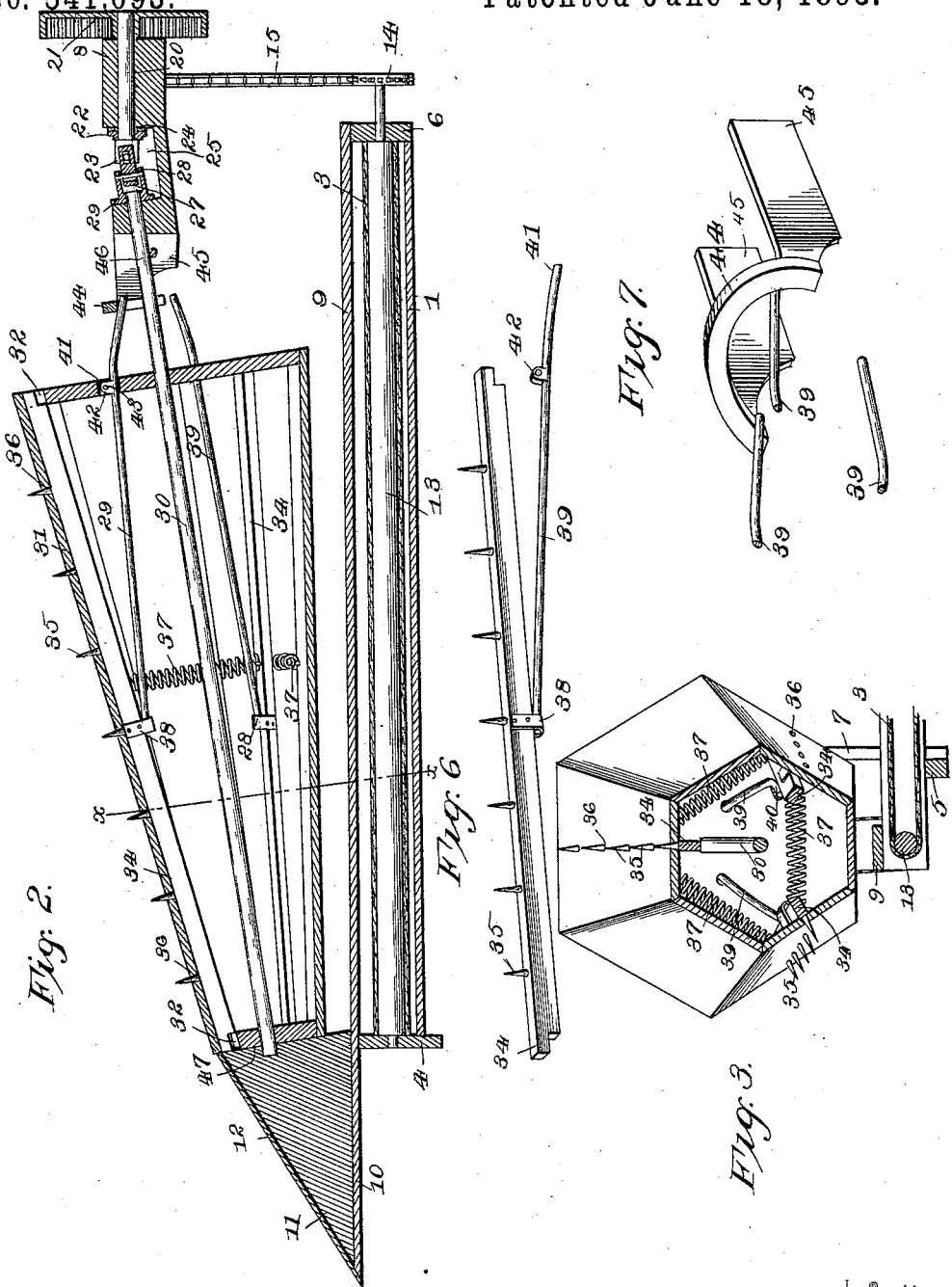
Witnesses
Chas A Ford.
J. R. Owens.
By his Attorneys.
Inventor
A. J. Johnson,
C. A. Snow & Co.

UNITED STATES PATENT OFFICE.

ANDREW J. JOHNSON, OF ARBUCKLE, CALIFORNIA.

HARVESTER ATTACHMENT.

SPECIFICATION forming part of Letters Patent No. 541,093, dated June 18, 1895.

Application filed August 22, 1894. Serial No. 521,008. (No model.)

*To all whom it may concern:*

Be it known that I, ANDREW J. JOHNSON, a citizen of the United States, residing at Arbuckle, in the county of Colusa and State of California, have invented a new and useful Harvester Attachment, of which the following is a specification.

My invention relates to an improvement in those harvester attachments which are adapted to separate the standing grass or grain from that which has been cut, and to so act on the standing grain that it will be straightened out and put in position to be subsequently cut; and the principal feature of the invention lies in certain details of construction whereby the grain is more effectually operated on and the two kinds properly divided. This end I attain by a peculiarly constructed, revolving, conical head provided with retracting teeth or fingers, operated by the revolutions of the head, and adapted to move in and out thereof, and to act on the grain to produce the above-stated result. All of this will fully appear hereinafter and the novel and patentable parts be finally embodied in the claims.

In the accompanying drawings, Figure 1 represents a perspective view of a portion of a binder-platform having my improvements applied and showing their *modus operandi*. Fig. 2 represents a longitudinal section taken through the head. Fig. 3 is a cross-section on the line *x x* of Fig. 2. Fig. 4 is a perspective view showing the driving-roller and the directly-attached parts, whereby motion is imparted to the parts. Fig. 5 is an enlarged view showing the universal connection between the sections of the main shaft. Fig. 6 is a detail perspective showing the finger-bar and attached fingers, together with the rod for operating. Fig. 7 is an enlarged perspective of the cam-plate and showing its relation to the finger-bar rods and the means for securing it to the machine.

The reference numeral 1 indicates a portion of a harvester platform, having the cutting apparatus 2 and its appurtenances, and the grain-conveying apron 3, attached thereto. All of this is of the usual construction and does not require further description. Secured to the sickle-bar 4, and projecting rearwardly therefrom, is the runner 5, which proceeds to and slightly beyond the lateral frame-beam 6.

The runner 5 is rigidly secured to the beam 6, and has the vertical posts 7 rigidly affixed thereto, just rearward of the beam. From the runner 5 the posts 7 arise, parallel with each other and are rigidly secured at their upper ends to the longitudinal block 8.

9 indicates a brace, which extends parallel with the runner 5 and from the sickle-bar 4 to the beam 6, to both of which it is rigidly secured, the forward end of the brace terminating in a horizontally-extended portion 10, which lies above the sickle-bar and has the conical head-block 11 fixed thereto.

The block 11 may be formed of any material. It is preferred, however, to form it of wood and furnish a sheet-metal covering 12, whereby it is protected. Journaled in the outer extremities of the beam 6 and sickle-bar 4, and extending longitudinally with the machine, is the roller 13, over which the outer end of the apron 3 passes, and by means of the apron the roller 13 is revolved continuously. The rear end of roller 13 is extended beyond the beam 6 and provided with a sprocket-wheel 14, and this wheel is adapted for the reception of the lower end of the sprocket-chain 15, which proceeds upwardly to the sprocket-wheel 16, fixed in its turn to the short longitudinal shaft 17.

Shaft 17 is revolubly mounted in the boxes 18, fixed to the right-hand side of the block 8, and extends rearwardly to the rear extremity of such block, where it is provided with the pinion-gear 19. Mounted in the block 8 and extending longitudinally thereon and beyond its rear end, is the shaft 20, to which the internal spur-gear 21 is fixed, so as to revolve therewith, and the gear 19 is adapted to be arranged within the periphery of the gear 21, and to mesh with the teeth thereon, whereby the spur-gear 21 is made to revolve in unison with the revolutions of gear 19. By this means the power from apron 3 is transmitted to the shaft 17 and thence to the shaft 20.

Formed in the upper side of the beam 8, and extending nearly down to the lower side thereof, is the recess or cavity 25, and it is here that the front end of shaft 20 terminates. Rigidly secured to, or formed integral with, the said front end of the shaft 20, is the head 22, which is formed with the two oppositelyarranged lugs 23 thereon, and provided with an antifriction washer 24, which is interposed between the head and the rear side of the cavity 25, and which serves to lessen the friction between the two parts. Located between the arms or lugs 23, and pivotally secured therein by the pin 26, is the intermediate block 27, which projects beyond the head 22, and has its forward end pivotally secured between the lugs 28 of the head 29. The head 29 is, in turn, rigidly secured to, or formed integral with, the rear end of the main shaft 30, which has such end revolubly journaled in that part of beam 8 which lies forward of the cavity 25, while its forward end is similarly journaled in the head-block 11. Thus it will be seen that shafts 20 and 30 are connected to each other so as to be incapable of independent movement, and are practically one shaft, and yet they extend at different angles. It will be readily seen that it is the purpose of block 27 to effect this result. Fixed to the shaft 30, and occupying its whole extent, excepting a small portion to the rear, is the conical head 31, which is the essential feature of my invention, and which is that device referred to hereinafter as "the head." This consists of a hollow body, formed preferably of wood and hexagonal in cross-section, and tapering from the rear to the forward end, the forward end being formed with a plane face 47, which is adapted to lie flush with the rear face of the conical block 11, thus completing the otherwise frustrumed cone.

Formed in each end of the head 31, and directly adjacent to each alternate side thereof, are the radially-elongated slots 32, which are, in consequence of the described location, three for each end, and in longitudinal alignment. Located in each of the longitudinally-aligned openings 32 are the finger-bars 34, which are three in number, and capable of a limited radial movement within the limit of the slots 32. These bars extend the entire length of the head 31, and are provided with the fingers 35, which are engaged on their outer sides and which are adapted, respectively, to pass through the openings 36 formed in the sides of the head 31, and to have a movement therein, controlled by the movements of the bars 34.

Secured to each of the bars 34, at about their middle, and extending from one to another, are the springs 37, which are three in number and which operate to give the bars 34 a normal tendency inward, and consequently hold them in the inner extremities of the slots 32. These springs are not essentially arranged as described, and may be varied in form or arrangement as the conditions of the case may require. Fixed to each side of the bars 34, and curving around their inner sides, are the metallic bands 38, which operate as keepers for the forward ends of the levers 39. The forward ends of said levers are curved slightly inwardly to form theslight hook 40, which is adapted to partially embrace the bands 38, and to render the connection between these two parts secure, yet capable of slight independent movement.

From the bands 38 the levers 39 extend rearwardly, and approximately parallel with shaft 30, through the openings 41 of the rear end of the head 31, and rearwardly therefrom to a point near the front end of the beam 8. At the openings 41 the levers 39 are formed with the lugs 42 thereon, through which the pins 43 pass, and into the rear end of the head, thus pivotally mounting or fulcruming the levers 39, so that they will be capable of swinging toward and from the shaft 30. The movement of the levers 39 is effected by means of the cam plate 44, which is fixed to the front end of the beam 8, by means of the rigid plates or arms 45, secured in their turn to the front sides of the beam and projecting forwardly to the rear ends of the levers 39. The cam plate 44 is secured to the ends of the arms 45, and is, therefore, in position to engage the rear ends of the levers, and consists of a voluted plate or rim having its largest radius at its right-hand extremity, while the left-hand extremity has the smallest radius, and the result of a gradual inward convolution of the plate. Thus, as the head 31 revolves, the rear ends of its levers 39 will each engage the inner side of the plate 44, as they are presented thereto by the aforesaid revolutions of the head 31, and as the revolutions of the head continue, the said rear ends will be forced inward under the influence of the cam, until the left-hand end thereof is reached, whereupon the levers will pass out of the domain of the cam and resume their normal position under the influence of the springs 37.

46 indicates a brace-rod, which is secured to each of the arms 45, and which extends from one to another, whereby they are braced as against each other.

In operation the machine is started to moving and driven through the field of grain or grass as usual, whereupon the apron 3 will operate over the roller 13 and impart to it a continuous rotary movement, which will be transmitted to the shaft 17, by the chain 15, and co-operating sprocket-wheels. From the shaft 17 the motion is transmitted to the shaft 20, and thence to shaft 30, and all by previously-described means, so that it is now fully understood. With the shaft 30 revolves the head 31, and the parts should be so related to each other that the head will be made to move from right to left, calculating from its upper side. As the head 31 moves in its characteristic lines the levers 39 are forced to move also, and when so doing they will be alternately engaged and disengaged with the cam plate 44, whereby they will be swung on their fulcrums and toward and from the shaft 30, thus causing the finger-bars 34 to move radially, and with them the fingers 35, which travel in and out of their respective openings 36. Thus the fingers 35 are alternately presented and retracted through their openings, and the cam 44 is so related to the levers 39 that it will cause the fingers 35 to project out of their openings when on the right-hand side of the head 31, and approximately level with the shaft 30, and so that they continue presented until the head has made one-half a revolution, whereupon they pass the cam 44 and springs 37 draw them in. As the machine moves through the grain, the head 31, by means of its fingers, engages the standing grain and throws it so as to assume a substantially vertical position, and effectually divides the cut grain from the uncut by throwing the former well upon the apron 3. By this means the edge of the standing or uncut grain is left clear and devoid of fallen and stray cut grain, which operates to entangle and confuse the cutting apparatus when the machine returns.

It will be understood that the purpose of the alternately-advancing and retiring fingers is to have them in operative position when moving in a way which makes them capable of carrying the grain inwardly, and to have them hidden in the head when they would be capable of operating to carry the grain outwardly. Following this, the fingers are out when on top of the head and retracted when under the same.

Having described my invention, what I claim is—

1. The combination with a harvester platform, of a longitudinally-extending and revolving head adapted to be secured to its outer end, a bar arranged in the head and extending longitudinally therein and capable of radial movement in the head, a spring for giving the bar a tendency inward, fingers secured to the bar and adapted to move therewith and to project through openings in the head, and means for moving the bar, whereby the fingers are similarly moved through their respective openings, so as to be in position to engage the grass or grain as the head revolves, and allowed to be retracted by the tendency of the bar, substantially as described.

2. The combination with a harvester platform, of a longitudinally-extending and revolving perforated head adapted to be secured to its outer end, a series of fingers in the head and capable of moving radially through the perforations in the head, a spring for giving the fingers a tendency inward a lever pivoted in the head and having a connection with the fingers, and a stationary cam plate adapted to be engaged by the levers as they revolve with the head, whereby the fingers are caused to move through the perforations in the head and to be retracted by the spring when the levers pass the cam plate, substantially as described.

3. The combination with a harvester platform, of a longitudinally-revolving and perforated head adapted to be secured to the platform, a bar located in the head a spring for giving the bar a tendency inward, said bar being capable of radial movement, fingers secured to the bar, and adapted to move therewith through the perforations in the head, a lever connected at one end to the bar and fulcrumed to the head, and a stationary cam plate with which the lever is adapted to engage, whereby it is moved on its fulcrum and the fingers made to pass through the perforations in the head and subsequently allowed to retract when the lever is released by the cam, substantially as described.

4. The combination with a harvester platform, of a longitudinally-extending and perforated head, a shaft passing through the head, whereby it is revolved, a series of fingers in the head and capable of moving radially through the perforations in the head, a spring for giving the fingers a tendency inward, a lever fulcrumed to the head and connected to the fingers and a stationary cam plate with which the lever is adapted to engage and disengage as it revolves with the head, whereby the fingers are made to move outwardly through the perforations in the head and whereby they are allowed to return when the cam and lever disengage, substantially as described.

5. The combination with a harvester platform, of a longitudinally-extending head adapted to be secured to the platform in an inclined position, alternately advancing and retracting fingers on the head, an inclined shaft upon which the head is mounted, and a horizontal shaft having a universal connection with the inclined shaft and adapted to have the power for revolving the head imparted thereto, whereby the inclined shaft is revolved by the horizontal shaft, irrespective of the dissimilarity of their disposition, substantially as described.

6. The combination with a harvester platform, of a continuously revolving and perforated head extending longitudinally with the harvester, a series of fingers within the head and capable of alternately advancing and retracting through the perforations thereof, and means substantially as described for so operating the fingers.

7. The combination with a harvester platform of a conical and perforated head formed with smooth and continuous sides, and hollow throughout its interior, a series of fingers within the head and capable of advancing and retracting through the perforations of the head, and means for continuously revolving the head and for operating the fingers, substantially as described.

In testimony that I claim the foregoing as my own I have hereto affixed my signature in the presence of two witnesses.

ANDREW J. JOHNSON.

Witnesses:
 ALEX. TINNEY,
 DAVID ROBB.